United States Patent [19]

Iwase et al.

[11] Patent Number: 5,419,625
[45] Date of Patent: May 30, 1995

[54] ANTISKID BRAKING DEVICE FOR MOTORCYCLE

[75] Inventors: Keiji Iwase; Toshio Miyamoto; Takayo Yamamoto; Takaya Ohta, all of Hamamatsu, Japan

[73] Assignee: Suzuki Kabushiki Kaisha, Japan

[21] Appl. No.: 172,808

[22] Filed: Dec. 27, 1993

[30] Foreign Application Priority Data

May 14, 1993 [JP] Japan .................................. 5-113174
May 26, 1993 [JP] Japan .................................. 5-124409

[51] Int. Cl.⁶ .................................................. B60T 8/32
[52] U.S. Cl. ........................... 303/116.1; 180/219; 188/344; 303/113.1; 303/119.1
[58] Field of Search ............... 303/116.1, 113.1, 119.2, 303/119.1, 115.6, 116.3, 116.4; 188/344, 181 A; 180/219

[56] References Cited

U.S. PATENT DOCUMENTS

| | | | |
|---|---|---|---|
| 4,494,800 | 1/1985 | Hayashi | 188/344 X |
| 4,697,825 | 10/1987 | Hayashi et al. | 188/181 A X |
| 4,702,339 | 10/1987 | Hayashi et al. | 180/219 |
| 4,852,701 | 8/1989 | Wakatsuki | 303/115.6 |

FOREIGN PATENT DOCUMENTS

0518375A3 12/1992 European Pat. Off.
0533436A3 3/1993 European Pat. Off.
2-11448 1/1990 Japan ................................ B60T 8/54

*Primary Examiner*—Douglas C. Butler
*Attorney, Agent, or Firm*—Ronald P. Kananen

[57] ABSTRACT

An antiskid braking device for a motorcycle includes a single pump unit which is used to repressurize braking mechanisms of front and rear wheels of the motorcycle and mounted almost in a central portion of a body frame of the motorcycle and a master cylinder of the front wheel. Middle portions of front wheel brake pipes connecting the pump unit to the braking mechanisms are formed of metallic pipes, both ends of the metallic pipes are connected to the braking mechanisms, the master cylinder and the pump unit through flexible brake hoses, and the metallic pipes are arranged along an inside face of a pair of bilateral tank rails of the body frame extending rearward from a head pipe of the motorcycle. The pump unit is mounted so as to extend in a longitudinal dimension thereof along a longitudinal direction of the motorcycle and a brake pipe port section faces front and rear directions of the body of the motorcycle.

9 Claims, 13 Drawing Sheets

ANTISKID BRAKING DEVICE FOR MOTORCYCLE

BACKGROUND OF THE INVENTION

The present invention relates to an antiskid braking device for a motorcycle having an improved mounting structure.

Regarding an antiskid braking device which brakes over the shortest possible distance and stops a motorcycle without locking the wheels when braking suddenly or braking on a slippery road, a control device detects an indication that the wheels may lock and reduce the master cylinder pressure applied to the braking mechanism (brake caliper and the like) preventing the wheel from locking. When the indication that the wheel may lock diminishes, the control device actuates the pump unit to repressurize the control mechanism with an appropriate pressure. By repeating the aforementioned operation steps quickly, it is possible to brake and stop the motorcycle after it travels over the shortest possible distance.

Generally, in an antiskid braking device provided on a motorcycle, a single pump unit is employed to repressurize the braking mechanism on the front and rear wheels. Because the pump unit is relatively heavy, it is arranged almost in a central portion of the body frame so that the pump unit is located near the center of gravity of the body. Brake pipes extend to the back and the front of the body from the pump unit and, then, are connected to the control mechanisms and the master cylinders of the front and rear wheels.

The front wheel brake pipes which connect the braking mechanism and the master cylinder of a motorcycle to the pump unit extend a relatively long distance. Thus, generally, the middle portions of the brake pipes are formed of metallic pipes to avoid expansion of the pipes due to brake fluid pressure, and both ends of the metallic pipes are connected to the front wheel braking mechanism, the master cylinder and the pump unit through flexible brake hoses.

In one aspect, since the metallic pipe sections of the front wheel brake pipes extend a long distance from the front of the body to the rear as described above, there is a fear that the metallic pipes may hit the ground and be damaged when a motorcycle falls down.

Further, an electric wire harness which extends from the front to the rear of the body of the motorcycle is placed along the metallic pipes on the body frame of the motorcycle. Thus, the mounting space for the metallic pipes is reduced, but the electric wire harness is likely to interfere with the metallic pipes when assembled to the body frame, thereby hindering the assembly process.

Furthermore, in conventional motorcycles, since connecting sections which connect the front ends of the metallic pipes of the front wheel brake pipes to the brake hoses are arranged in a relatively forward position, the brake hoses are made short. Thus, there is a fear that the brake hose may be forcibly bent when steering, thereby leading to damage or leakage of brake fluid.

In another aspect, a prior art provides an antiskid braking device such as disclosed in Japanese Patent Application Laid-Open No. 2-11448, for example, in which the pump unit is mounted perpendicularly to the length of the body of a motorcycle and the brake pipe port section of the pump unit faces the side of the body. To facilitate connecting the brake pipes, the brake pipe port section protrudes from the side of the body frame.

In such prior art, since the pump unit is mounted perpendicularly to the longitudinal direction of the body and the brake pipe port section protrudes from the side of the body frame, when a motorcycle falls down or is hit on the side, there is a fear that the pump unit or the brake pipes may be damaged. In addition, since the brake pipes are grouped on the side of the pump unit, it is difficult to flexibly structure the brake pipes, thus providing a bad layout thereof.

Furthermore, since the pump unit is mounted perpendicularly to the longitudinal direction of the body, it is necessary to enlarge the width of the body frame to support the pump unit and place it above the drive chain to avoid interfering with the drive chain. Thus, the width and height of the driver's seat are necessarily increased so that foot contact to a pedal or ground becomes less accessible.

Still further, the heavy pump unit is offset from the center of the body along the width thereof, thus the bilateral weight balance of the motorcycle body can be adversely affected.

In such a motorcycle structure, the pump unit is fastened to the body frame via fixing brackets provided on the body frame. However, since the internal space of the motorcycle is limited, it is difficult to provide the body frame with a number of fixing brackets and, further, to fix the pump unit firmly. If fixing brackets are provided on a body frame, when the body frame is adapted to a motorcycle having no antiskid braking device easily, all the fixing brackets will be wasted.

SUMMARY OF THE INVENTION

A primary object of the present invention is to substantially eliminate defects or drawbacks encountered in the prior art as described above to provide an improved antiskid device for a motorcycle.

In detail, an object of the present invention is to provide an antiskid braking device for a motorcycle which is capable of protecting the metallic pipes of the front wheel brake pipes when a motorcycle falls down or an equivalent event occurs, improving the assembly process of the front wheel brake pipes and the electric wire harness, and ensuring a long brake hose for the front wheel brake.

Another object of the present invention is to provide an antiskid braking device of a motorcycle which is capable of protecting the pump unit and the brake pipes from being damaged when the motorcycle falls down and an equivalent event occurs and providing antiskid braking device design facilitating the flexible design of the brake pipes.

A further object of the present invention is to provide an antiskid braking device of a motorcycle capable of reducing the number of fixing brackets for fixing the pump bracket and making the best use of the space, which antiskid braking device improves the bilateral weight balance of the body and reduces the width and height of the driver's seat so as to make foot contact more accessible.

These and other objects can be achieved according to the present invention by providing, in one aspect, an antiskid braking device for a motorcycle including a single pump unit which is used to repressurize braking mechanisms of front and rear wheels of the motorcycle and mounted almost in a central portion of a body frame of the motorcycle and a master cylinder of the front wheel, wherein middle portions of front wheel brake pipes connecting the pump unit to the braking mechanisms are formed of metallic pipes, both ends of the metallic pipes are connected to the braking mechanisms, the master cylinder and the pump unit through flexible brake hoses, and the metallic pipes are arranged along an inside face of a pair of bilateral tank rails of the body frame extending rearward from a head pipe of the motorcycle.

In a preferred embodiment, the metallic pipes are arranged along an inside face of either one of the bilateral tank rails of the body frame and an electric wire harness extending from the front to the rear of a body of the motorcycle is arranged along an inside face of another one of the tank rails of the body frame.

Connecting sections connecting front ends of the metallic pipes to the brake hoses are arranged near the head pipe of the body frame below a fuel tank disposed between the head pipe and a seat for a rider and connecting sections connecting rear ends of the metallic pipes to the brake hoses are arranged near and above a pivotal section of swing arms disposed forward the rear wheel.

According to the antiskid braking device for a motorcycle of this aspect having the structure described above, the metallic pipes of the front wheel brake pipes are arranged along the inside face of the tank rail of the body frame. Thus, the metallic pipes are protected by the tank rail from hitting the ground and being damaged when a motorcycle falls down.

Since the metallic pipes are arranged along the inside face of one of r the right and left tank rails of the body frame and the electric wire harness which extends from the front to the rear of the body is arranged along the inside face of the other one of the tank rails of the body frame, the metallic pipes and the electric wire harness are placed separately on the body frame. Consequently, the mounting space for the metallic pipes and the electric wire harness are enlarged and the possibility of interference between the metallic pipes and the electric wire harness is eliminated, thereby improving the assembly process markedly.

Furthermore, the connecting sections which connect the front ends of the metallic pipes to the brake hoses are arranged near a head pipe of the body frame below the fuel tank and the connecting sections which connect the rear ends of the metallic pipes to the brake hoses are placed near and above a pivotal section of swing arms, the connecting sections which connect both ends of the metallic pipes become more accessible, thereby improving the workability of the front wheel brake pipe assembly. Further, it is possible to extend the brake hoses of the front brake thereby preventing the brake hoses from being damaged when steering.

The above-mentioned objects can be also achieved according to the present invention in another aspect by providing an antiskid braking device for a motorcycle including a pump unit for repressurizing braking units for front and rear wheels of a motorcycle and a motor for driving the pump unit integrally arranged with the pump unit, wherein the pump unit is mounted so as to extend in a longitudinal dimension thereof along a longitudinal direction of the motorcycle and a brake pipe port section faces front and rear directions of the body of the motorcycle.

In an embodiment, the pump unit has a side portion on which a supporting member for supporting a body component is provided, and the pump unit is provided within the body frame of the motorcycle. The pump unit is held by a holding means formed as a fixing bracket for a rear cushion unit of the motorcycle. The pump unit is arranged side by side with the body component along a width direction of the body of the motorcycle and the pump unit is arranged on a side opposite to a drive chain for an engine unit beyond the body component such as buttery.

As described above, according to this aspect, the pump unit is mounted so that the longitudinal dimension of the pump unit runs along the length of the motorcycle and the brake pipe port section faces the front or the rear of the motorcycle. Thus, if the motorcycle falls down or is hit on the side, the pump unit and the brake pipes are protected from damage by the body frame. In addition, since the brake pipes are connected to the front or the rear of the pump unit, they can be laid out more flexibly. Still furthermore, the width of the body frame can be reduced.

The supporting member for supporting another component is provided on the side of the pump unit provided within the body frame. Thus, when the motorcycle falls down, the pump unit is guarded from being damaged by the supporting member and the body frame.

The fixing bracket of the rear cushion unit is used as a holding member for the pump unit as well. Thus, it is possible to reduce the number of holding members of the pump unit and make the best use of the space around the pump unit. The manufacturing cost of the body frame can be reduced and it can be easily adapted for a motorcycle having no antiskid braking device.

The pump unit is placed side by side with other component such as battery running along the body width and on the side opposite to the drive chain beyond the other component. Thus, the pump unit can be arranged at a lower position. For this reason and the fact that the width of the body frame can be minimized, it is possible to reduce the height and width of the driver's seat. Consequently, it is possible to make foot contact more accessible on the motorcycle.

The battery is mounted as the other component arranged side by side with the pump unit. Even if the pump unit is mounted on one side running along the body width, the bilateral weight balance of the motorcycle body can be maintained because the battery has almost the same weight as the pump unit.

The further natures and features of the present invention will be made more clear from the following descriptions made with reference to the accompanying drawings.

DESCRIPTION OF THE PREFERRED EMBODIMENTS

Preferred embodiments of the present invention will be described hereunder with reference to the accompanying drawings.

Figure 1:
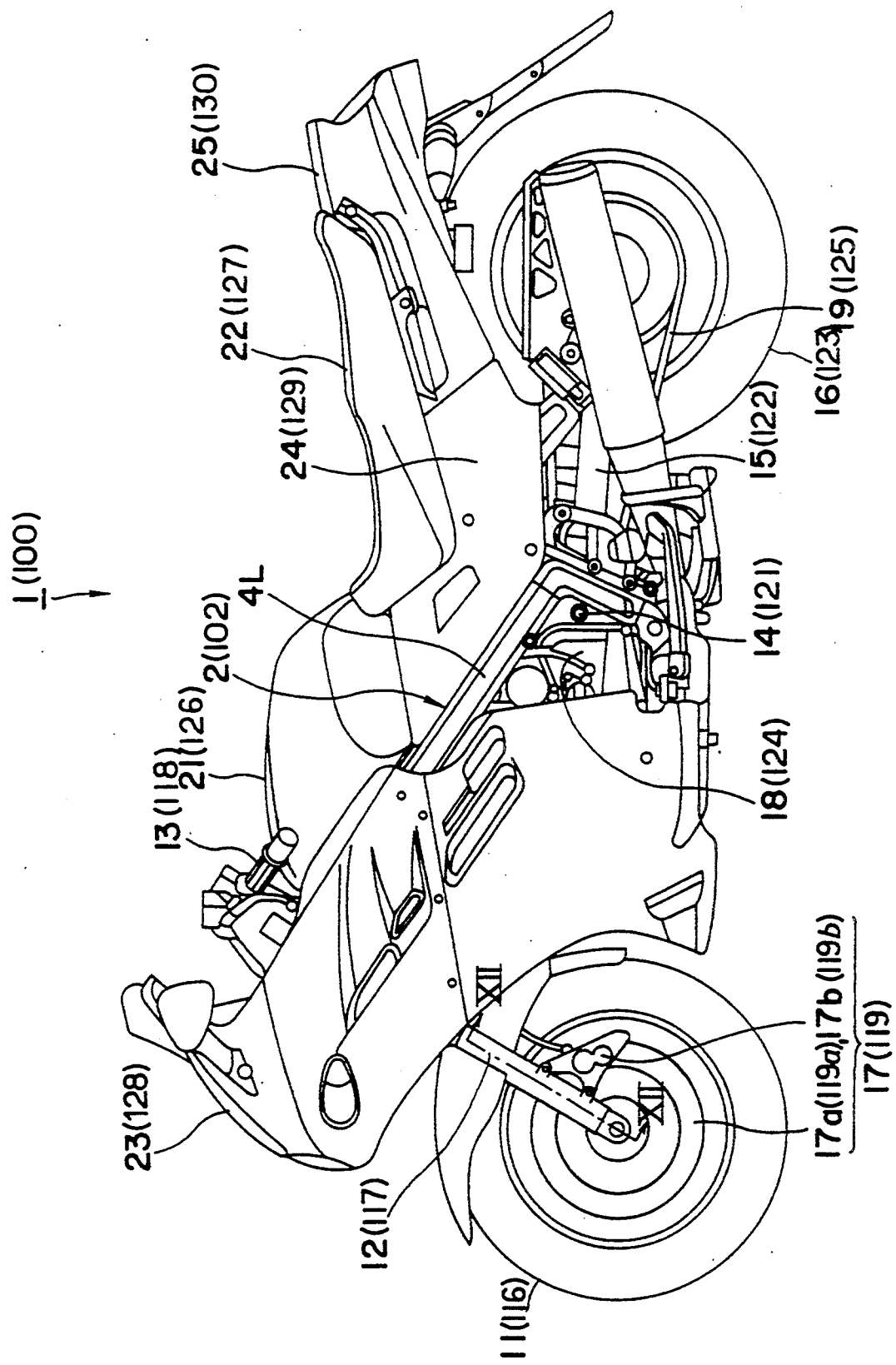
FIG. 1 is a left side view of a motorcycle provided with an antiskid braking device according to the present invention.
Figure 2:
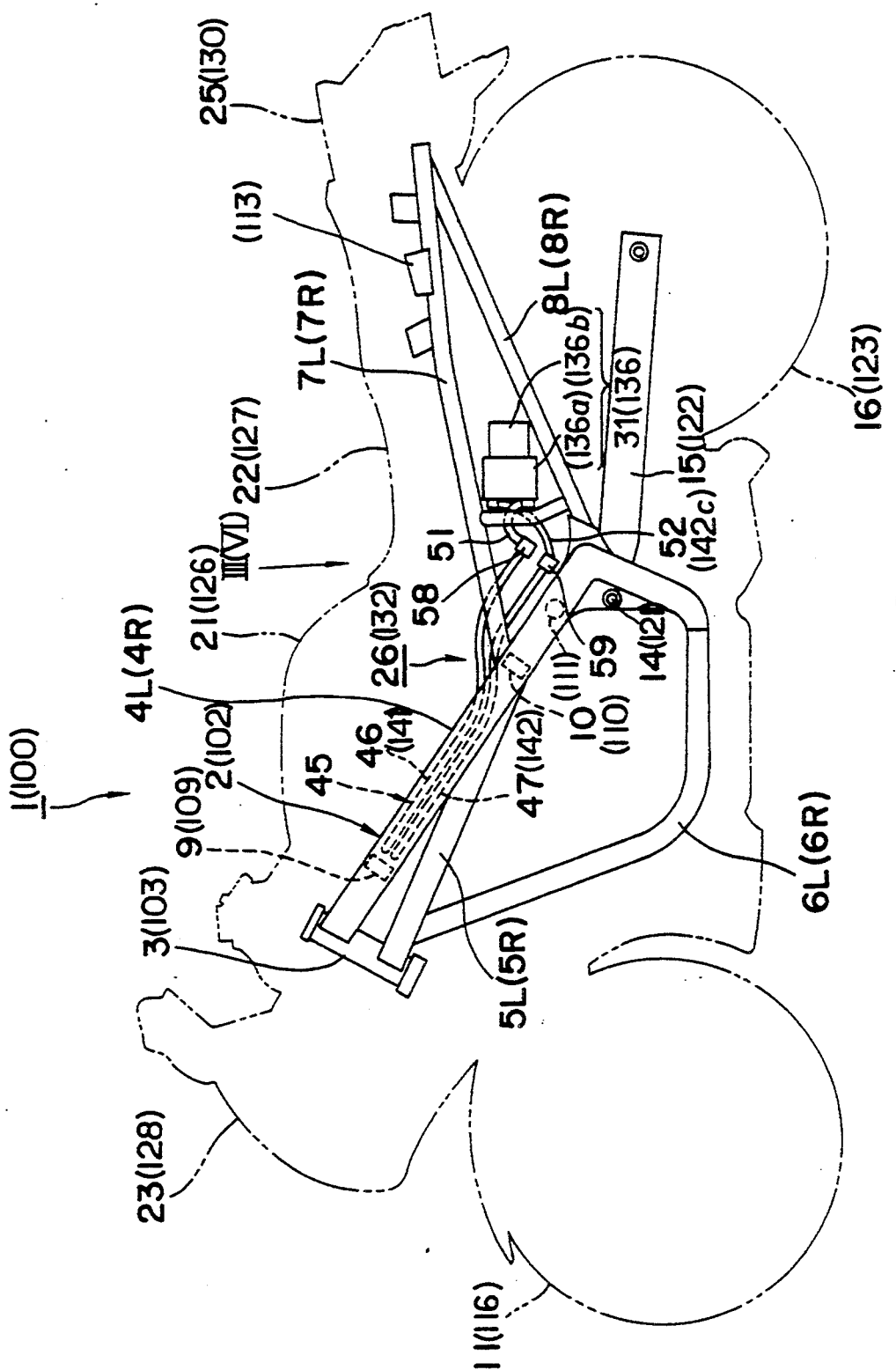
FIG. 2 is a left side view showing part of the body frame and the antiskid braking device shown in FIG. 1.
Figure 3:
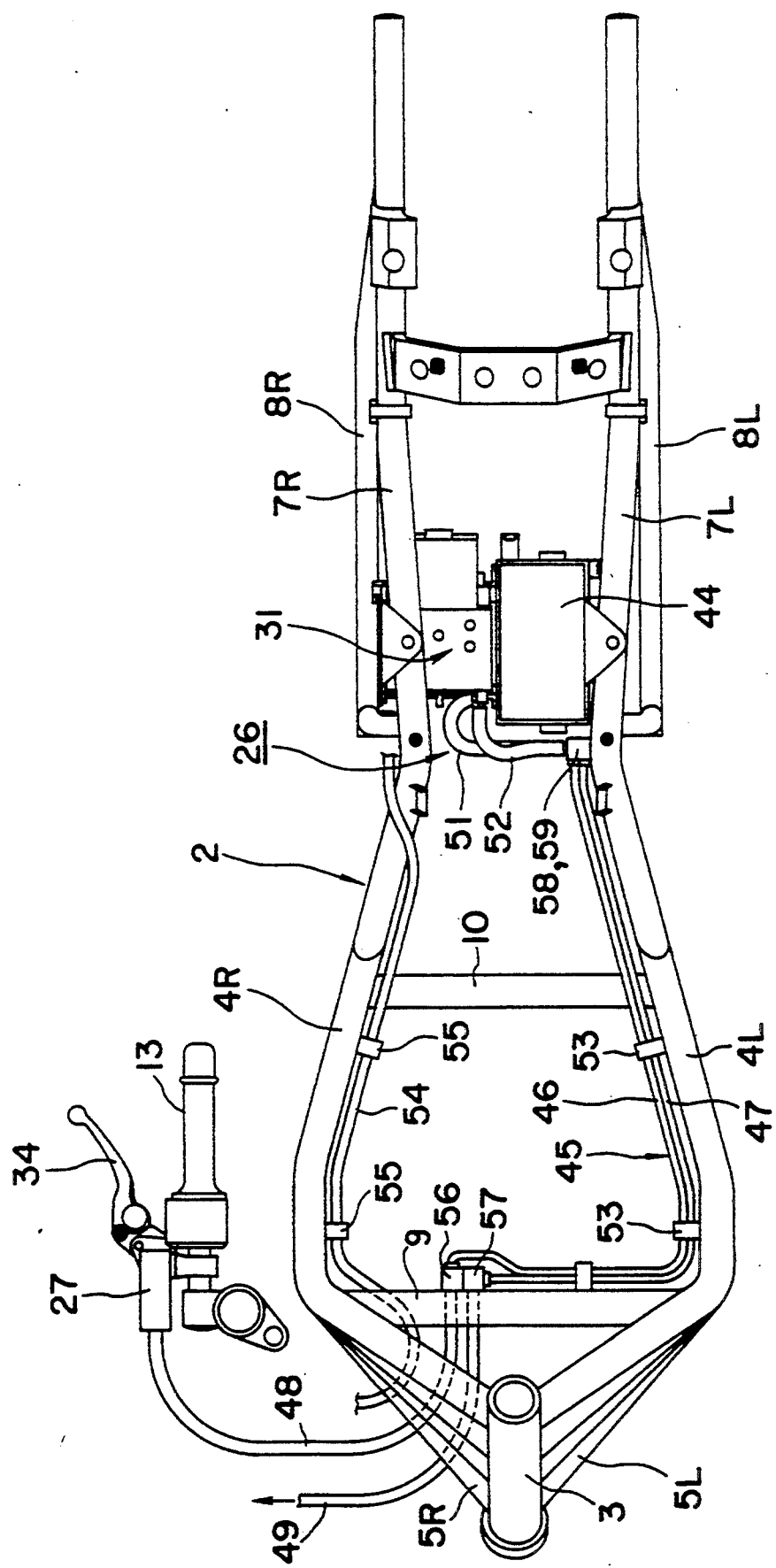
FIG. 3 is a plan view, viewed from an arrow III in FIG. 2, showing one embodiment of the present invention.
Figure 4:
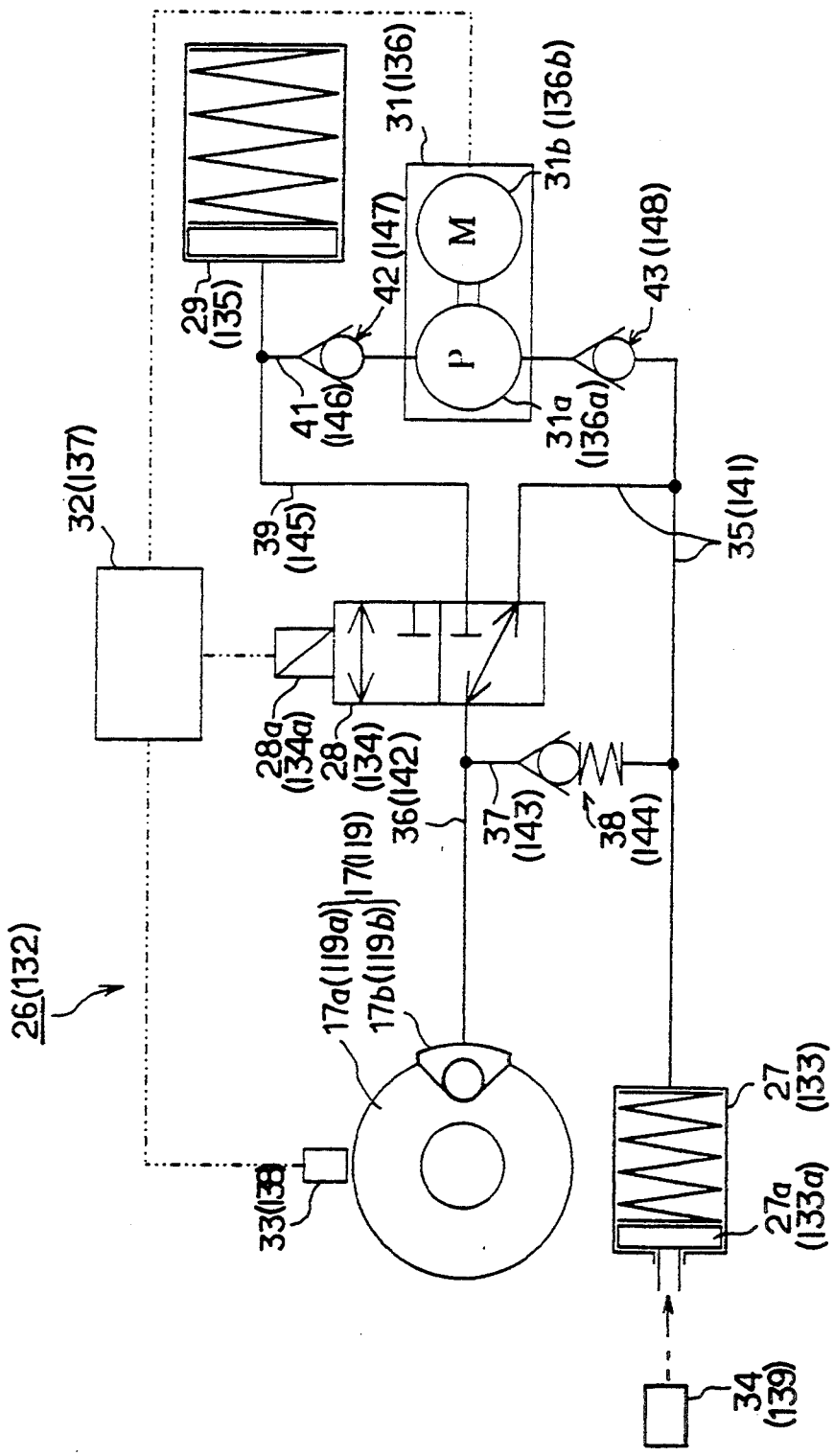
FIG. 4 is a diagram of the structure of the antiskid braking device, showing the condition when there is no indication that the wheel may lock.
Figure 5:
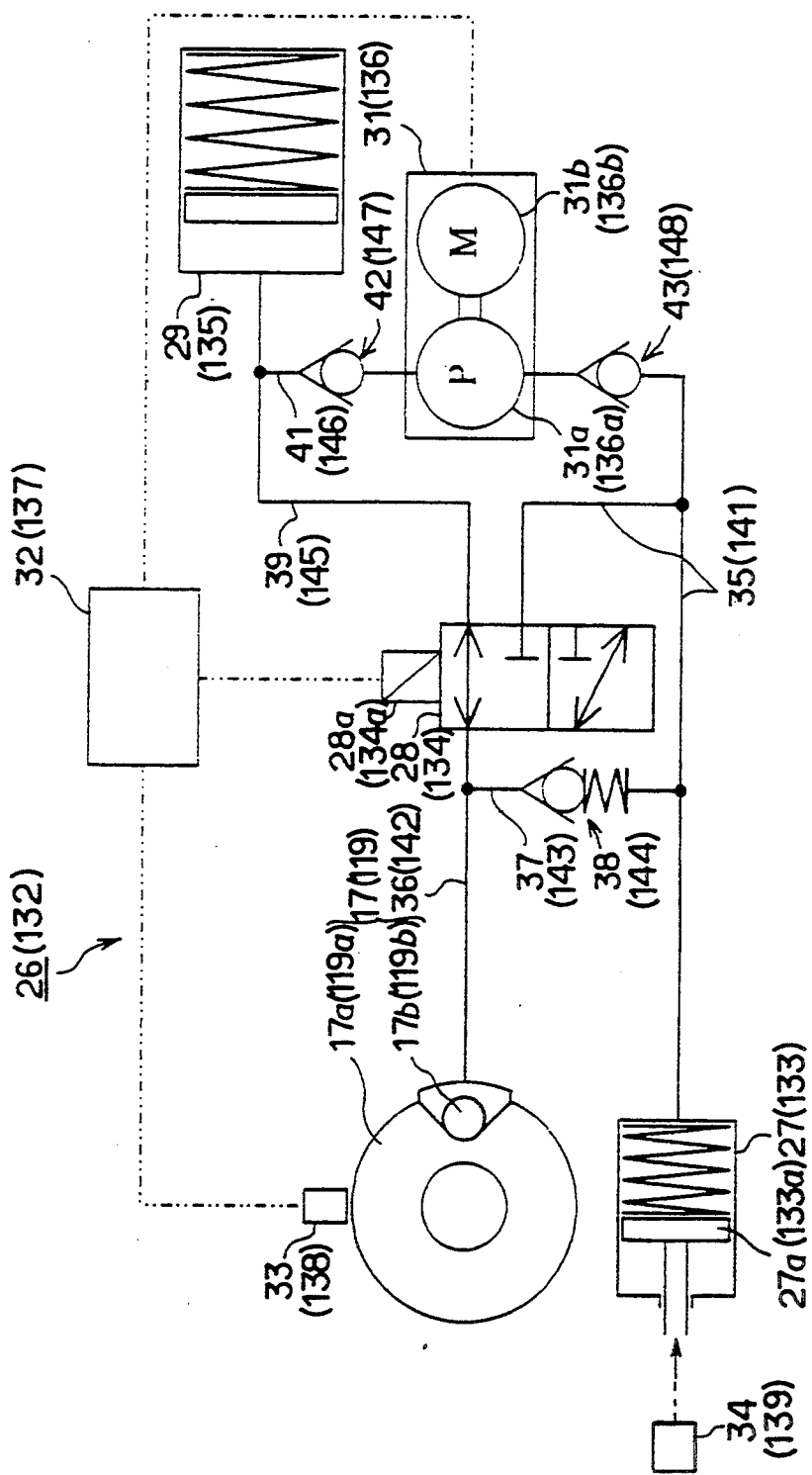
FIG. 5 is a diagram of the structure of the antiskid braking device, showing the condition when there is an indication that the wheel may lock.

First, one preferred embodiment will be described hereunder with reference to FIGS. 1 to 5 in which FIG. 1 is a left side view of a motorcycle having an antiskid braking device according to the present invention. FIG. 2 is a left side view showing part of a body frame and an antiskid braking device of the motorcycle shown in FIG. 1, FIG. 3 is a plan view viewed from a direction of an arrow III in FIG. 2 and FIGS. 4 and 5 are structural diagrams of the antiskid braking device of this embodiment.

In this embodiment, the motorcycle 1 includes, for example, a double-cradle type body frame 2. The body frame 2 has a head pipe 3 at its front end and a bilateral pair of left and right tank rails 4L and 4R, respectively, which extend backward from a head pipe 3 and then bent obliquely downward. Reinforcement rails 5L and 5R are provided below the above tank rails 4L and 4R. Down-stays 6L and 6R extend downward from the upper end portions of the reinforcement rails 5L and 5R and are connected to the rear ends of the above tank rails 4L and 4R.

A pair of left and right seat rails 7L and 7R, respectively, extend backward from the middle portions of the tank rails 4L and 4R. A pair of left and right seat stays 8L and 8R extend backward from the bent portions of the tank rails 4L and 4R and the rear ends of the seat stays 8L and 8R are fixed to the rear ends of the seat rails 7L and 7R. The left and right tank rails 4L and 4R are connected with each other by means of bridging members 9 and 10 which extend along the body width of the motorcycle.

Front forks 12 which support a front wheel 11 as well as the handle bar 13 are fixed to the head pipe 3 pivotally to the head pipe 3. Swing arms 15 which extend backward are pivotally fixed to a pivot shaft 14 provided on the bent portions of the tank rails 4L and 4R so that they are swingable up and down. A rear wheel 16 is supported by a shaft at the rear end of the swing arms 15. The rear wheel 16 is also equipped with a disc braking device.

An engine 18 is mounted in a space defined between the reinforcement rails 5L and 5R and the down-stays 6L and 6R and the engine 18 drives the rear wheel 16 through a chain 19. A fuel tank 21 is provided between the head pipe 3 and a driver's seat 22 and on the tank rails 4L and 4R, and the driver's seat 22 is mounted on the seat rails 7L and 7R.

The front portion of the body of the motorcycle 1 is covered with a front cowling 23 formed of a synthetic resin to reduce air resistance which is caused when the motorcycle is travelling. The side portions of the motorcycle body and the driver's seat are covered by a side cover 24 and a tail cowling 25.

The motorcycle 1 is provided with an antiskid braking device 26 shown in FIGS. 4 and 5. The antiskid braking device 26 comprises the disc braking unit 17 which brakes the wheel (front wheel 11 in this case), a master cylinder 27, a direction control valve 28, a pressure reducing cylinder 29, a pump unit 31, a control means 32 and a wheel speed sensor 33 which detects the rotation speed of the front wheel 11.

The disk braking unit 17 comprises a disc rotor 17a integrally provided on the front wheel 11 to be rotatable together and a brake caliper 17b provided so as to sandwich the disc rotor 17a. As shown in FIG. 1, the brake caliper 17b is fastened to the front fork 12.

When a brake operating force is applied to the master cylinder 27 from a brake lever 34 shown in FIG. 3, an internal piston 27a disposed inside the master cylinder 27 is pushed in as shown in FIG. 5 so that brake fluid filled in the master cylinder 27 is discharged.

The master cylinder 27 is connected to the direction control valve 28 through a fluid line 35 and the direction control valve 28 is connected to the brake caliper 17b through a fluid line 36. The line 35 is connected to the line 36 through a fluid line 37 and a check valve 38 which allows brake fluid to flow from the brake caliper 17b to the master cylinder 27 is provided on the way of the line 37.

The pressure reducing cylinder 29 is connected to the direction control valve 28 through a fluid line 39, which is connected to the line 35 through a fluid line 41. A pump 31a of the pump unit 31 is connected on the way of the line 41. Check valves 42 and 43 which allow brake fluid to flow from the pressure reducing cylinder 29 to the master cylinder 27 are connected on the upstream and downstream sides of the pump 31a. The pump unit 31 further includes a motor 31a to drive the pump 31a.

The control means 32 is operatively connected to a solenoid 28a which actuates the direction control valve 28, the motor 31b and the wheel speed sensor 33.

When the brake lever 34 is operated, the brake fluid in the master cylinder 27 is pressure-fed to the brake caliper 17b through the fluid line 35 and 36. Upon receiving the pressure from the master cylinder 27, the brake caliper 17b grips the disc rotor 17a from both sides thereof to brake the front wheel 11.

When the brake lever 34 is released, the brake fluid which was fed to the brake caliper 17b is returned to the master cylinder 27 through the fluid line 36 and 35, so that the pressure applied to the brake caliper 17b from the master cylinder 27 is released. Thus, the front wheel 11 is released from the braked state (see FIG. 4).

As the braking force increases when braking urgently or braking on a slippery road, the possibility of the front wheel 11 locking increases. In response to an input signal from the wheel speed sensor 33, the control means 32 detects an indication of the front wheel 11 locking. Then, the solenoid 28a is operated to change the direction control valve 28 from the state shown in FIG. 4 to that of FIG. 5.

Consequently, the fluid line 35 is closed so that the pressure applied to the brake caliper 17b by the master cylinder is released and the fluid line 36 communicates with the fluid line 39 so as to release the master cylinder pressure applied to the brake caliper 17b to the pressure reducing cylinder 29. The brake fluid is collected in the pressure reducing cylinder 29. Thus, the gripping force of the brake caliper to the disc rotor 17a is weakened to prevent the front wheel from being locked.

When it detects that locking of the front wheel 11 diminishes, the control means 32 immediately operates to shift the direction control valve 28 from the state shown in FIG. 5 to the state in FIG. 4, and the brake fluid collected in the pressure reducing cylinder 29 is returned to the brake caliper 17b by means of the pump unit 31, thereby repressurizing the brake caliper 17b. The pressure of the pump unit 31 at this time is adjusted by arithmetic operation of the control means 32 to a pressure which keeps the front wheel 11 from being locked.

By repeating the aforementioned operation steps, so-called antiskid action, quickly, a strong braking force is obtained without locking the front wheel 11, so that it is possible to brake over the shortest possible distance and stop the motorcycle with safety.

The antiskid braking device 26 further includes a disc braking device, a master cylinder, a pressure reducing cylinder, a direction control valve and so on, though not shown, for the rear wheel, and these components are also connected to the pump unit and the control means.

As shown in FIG. 3, the pump unit 31 as well as a battery 44 are arranged almost in the center of the body frame. The fluid line 35 shown in FIGS. 4 and 5 which connects the pump unit 31 to the master cylinder 27 and the line 36 which connects the pump unit 31 to the disc braking unit 17 are incorporated in the front wheel brake pipes 45 which are provided on the body frame 2.

The middle portions of the front wheel brake pipes 45 are formed of metallic pipes 46 and 47 to avoid an expansion of the pipes due to brake fluid pressure. Both ends of these metallic pipes are connected to the disk braking device 17, the master cylinder 27 and the pump unit 31 through flexible brake hoses 49 and 48, and 51 and 52, respectively.

The metallic pipes 46 and 47 are arranged on the inside face of the tank rail 4L (or 4R) which is one of the tank rails of the body frame 2 by means of a plurality of holding members 53. An electric wire harness 54 which extends from the front to the rear of the motorcycle is arranged on the body frame 2. The electric wire harness 54 is arranged on the inside face of the tank rail 4R (or 4L) which is another one of the tank rails of the body frame 2 by means of a plurality of the holding members 55.

Connecting sections 56 and 57 which connect the front ends of the metallic pipes 46 and 47 to the brake hoses 48 and 49, respectively, are located near the head pipe 3 of the body frame below the fuel tank 21 and fixed on the middle of the back face of the bridging member 9. Connecting sections 58 and 59 which connect the rear ends of the metallic pipes 46 and 47 to the brake hoses 51 and 52 are placed near the top of the pivotal section, i.e. pivot shaft 14, of the swing arm 15 disposed forward the rear wheel 16.

The metallic pipes 46 and 47 extend from the connecting sections 56 and 57 to the left along the bridging member 9 and extend backward along the inside face of the tank rail 4L, connecting to the connecting sections 58 and 59.

According to the antiskid braking device 26 of this embodiment constructed as described above, the metallic pipes 46 and 47 of the front brake pipes 45 are arranged on the inside face of the tank rail 4L of the body frame 2. Thus, when the motorcycle falls down or an equivalent event occurs, the metallic pipes 46 and 47 are protected from hitting the ground and being damaged.

The metallic pipes 46 and 47 are arranged along the inside face of the tank rail 4L which is one of the tank rails of the body frame 2 and the electric wire harness 54 is placed on the inside face of the tank rail 4R which is other one of the tank rails. Thus, the metallic pipes 46 and 47 and the electric wire harness 54 are arranged separately on the body frame 2, thus enlarging the space in which the metallic pipes 46 and 47 and the electric wire harness 54 are to be arranged. In addition, the possibility of interference between the metallic pipes 46 and 47 and the electric wire harness 54 is eliminated, thereby remarkably improving the body assembly process.

The connecting sections 56 and 57 which connect the front ends of the metallic pipes 46 and 47 to the brake hoses 48 and 49 are placed near the head pipe 3 of the body frame 2 below the fuel tank 21, and the connecting sections 58 and 59 which connect the rear ends of the metallic pipes 46 and 47 to the brake hoses 51 and 52 are placed near above the pivotal section of the swing arms 15. Thus, the connecting sections 56 and 57 and the connecting sections 58 and 59 are more easily accessible so that the front wheel brake pipes 45 can be installed more easily. Furthermore, the brake hoses 51 and 52 of the front wheel brake can be extended to eliminate the possibility of the brake hoses 51, 52 being damaged when steering.

As described above, according to one embodiment of the present invention, the antiskid braking device for a motorcycle includes a single pump unit which is used to repressurize braking mechanisms of front and rear wheels and is mounted almost in the center of the body frame, and front wheel brake pipes which connect the pump unit to the braking mechanism and a master cylinder of the front wheel, in which the middle portions of the front wheel brake pipes are formed of metallic pipes and both ends of the metallic pipes are connected to the braking mechanism, the master cylinder and the pump unit through flexible brake hoses, and the metallic pipes being arranged along the inside face of the tank rail of the body frame.

Thus, the metallic pipes are protected by the tank rail from hitting the ground and being damaged when a motorcycle falls down.

Other many advantages can be achieved according to the present embodiment as described in the SUMMARY OF THE INVENTION.

FIGS. 6 to 13 represent another, i.e. second, embodiment applicable to the motorcycle according to the present invention shown in FIGS. 1 and 2, in which reference numerals are applied to the aforementioned first embodiment and reference numerals in parentheses are applied to the second embodiment. For example, reference numerals 1 and (100) both denote a motorcycle and reference numerals applied to respective rail members such as 4L(4R), 5L(5R),—are commonly added, and these members or elements operate commonly and attain substantially the same functions in both the embodiments. Thus, duplicated description to the second embodiment is now omitted herein.

Figure 6:
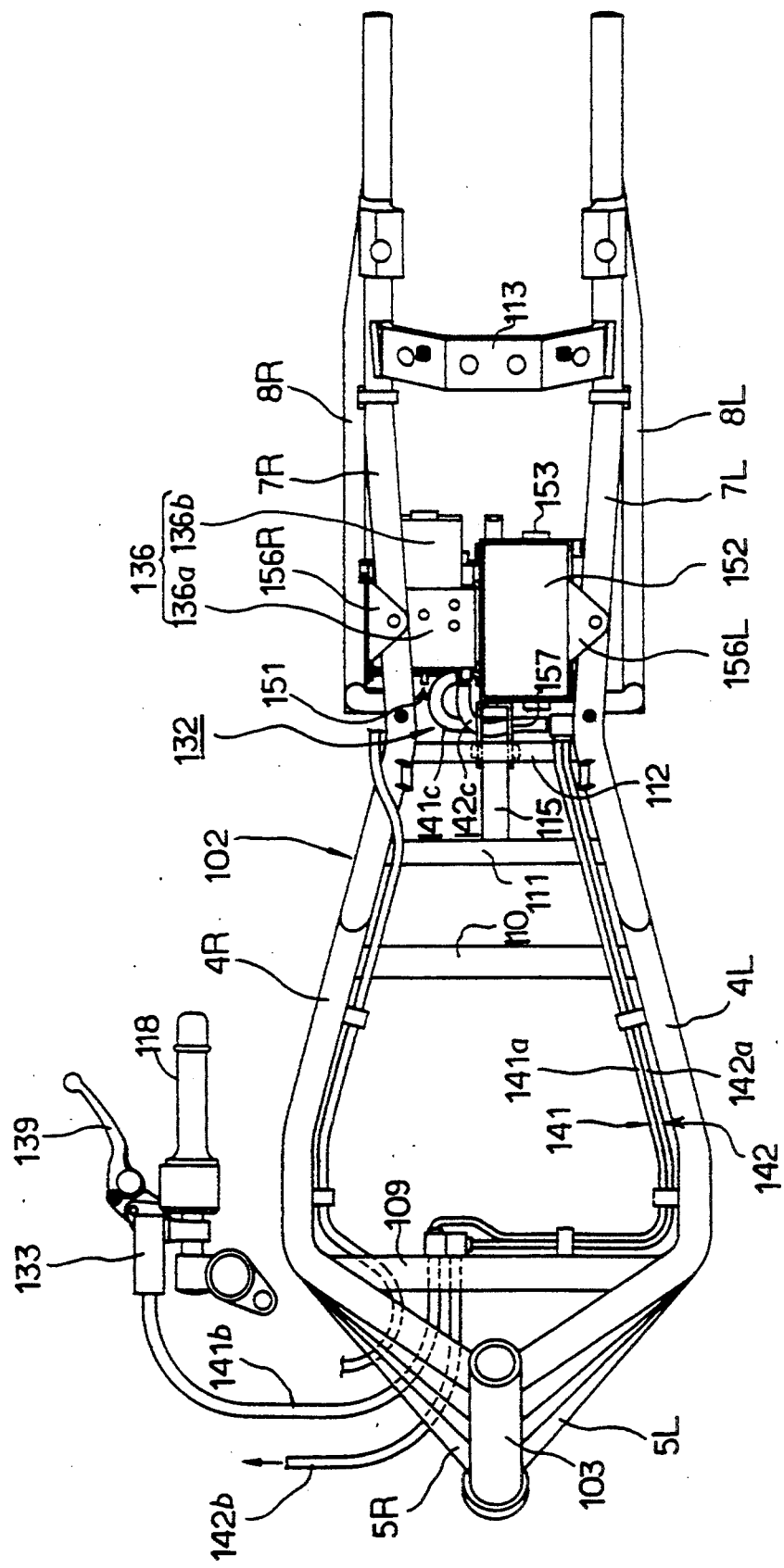
FIG. 6 is a plan view, similar to FIG. 3, viewed from an arrow VI in FIG. 2, showing another embodiment of the present invention.
Figure 7:
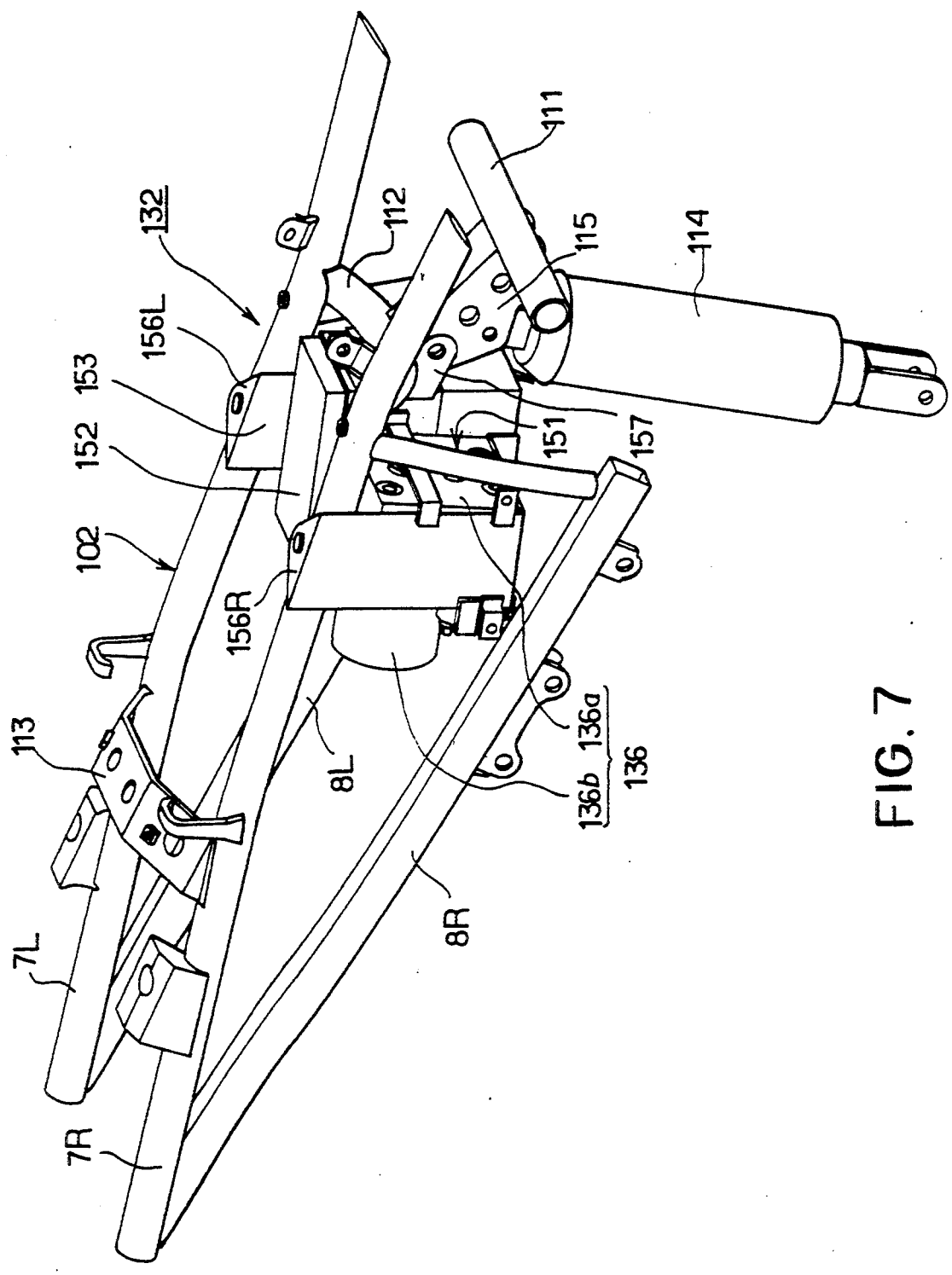
FIG. 7 is a perspective view showing the rear half of the body frame, taken obliquely from the right front.
Figure 8:
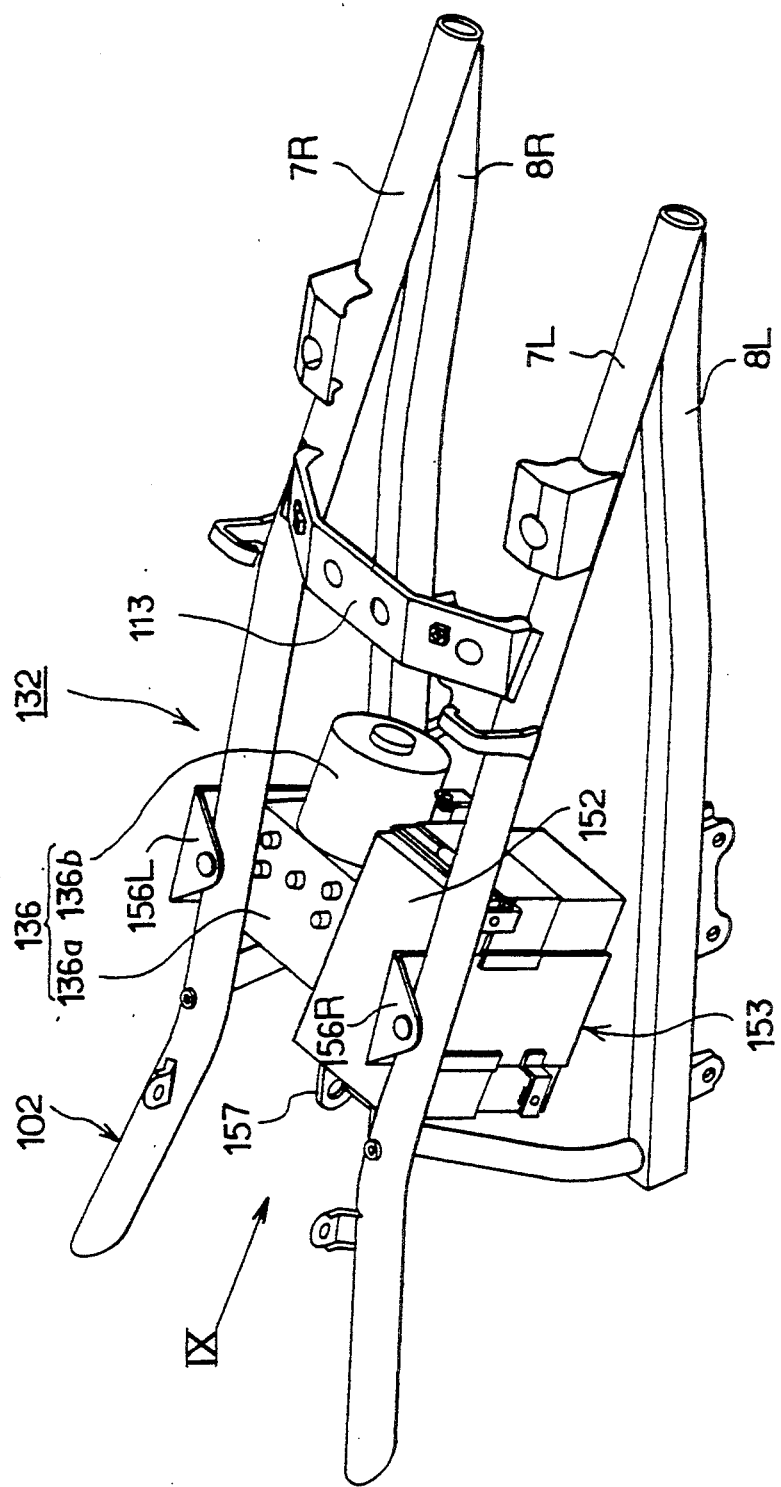
FIG. 8 is a perspective view showing the rear half of the body frame, taken obliquely from the left rear.
Figure 9:
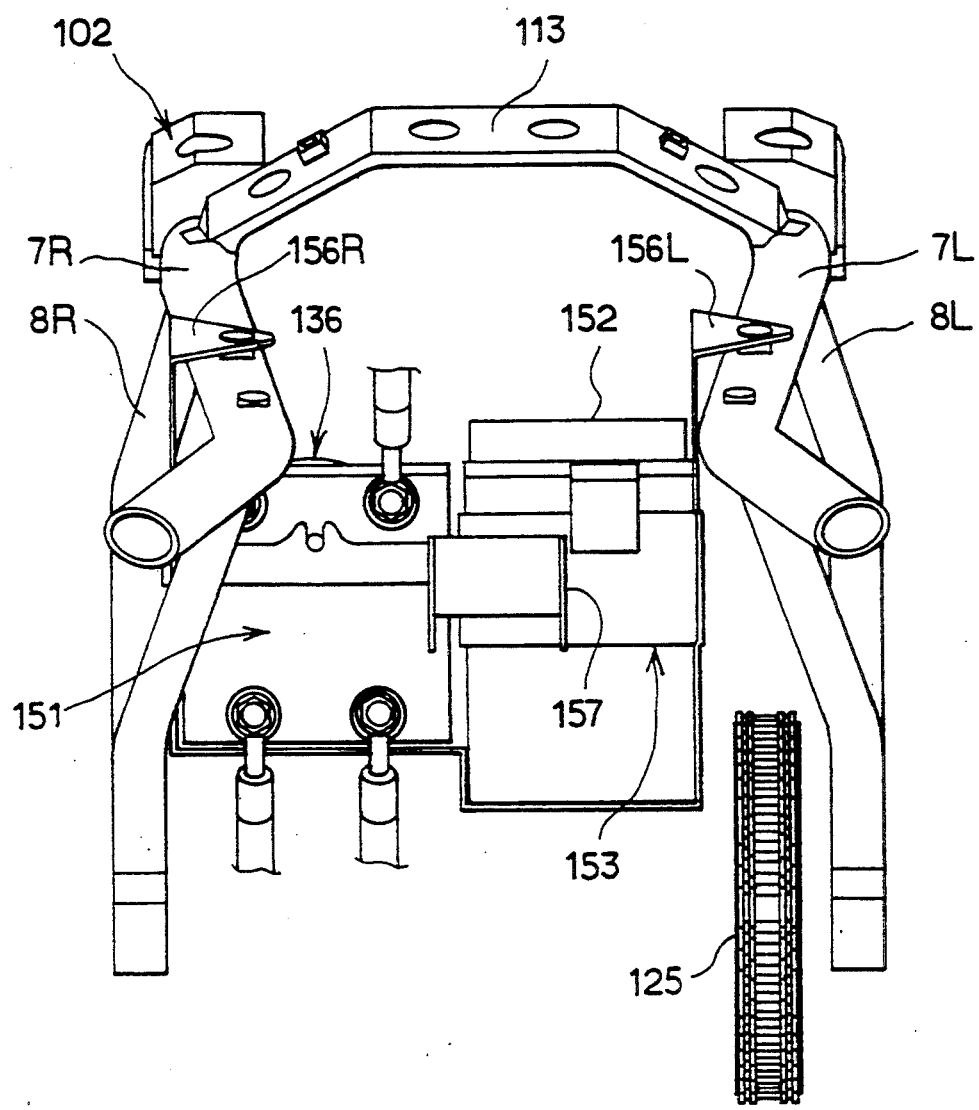
FIG. 9 is a front view according to the arrow IX in FIG. 8.

FIG. 6 shows a plan view of the motorcycle of FIG. 1 but related to the second embodiment of the present invention. In this plan view, structures including members 111, 112 and 115 and members associated therewith are different from those in the plan view of FIG. 3 related to the first embodiment, and the detailed structures are shown in FIGS. 7 to 9. Referring to these figures, a pair of left and right seat rails 7L and 7R, respectively extend backward from the middle portions of the tank rails 4L and 4R (FIG. 2). A pair of left and right seat stays 8L and 8R extend backward from the bent portions of the tank rails 4L and 4R and the rear ends of the seat stays 8L and 8R are fixed to the rear ends of the seat rails 7L and 7R, respective left and right tank rails 4L and 4R are connected with each other by means of bridging members 109, 110, 111 which extend along the width direction of the body frame of the motorcycle. The left and right seat rails 7L and 7R are connected with each other by means of bridging members 112 and 113 which extend along the body width. A fixing bracket 115 which fixes the top end of a rear cushion unit 114 is provided between the bridging member 112 and the bridging member 111.

The bottom end of the rear cushion unit 114 shown in FIG. 7 is connected to the principal ends of the swing arms 122 through a link member. Thus, when the swing arms 22 swing up and down, the rear cushion unit 114 absorbs the shock to return the swing arms 122 to its original position. The rear wheel 123 is also equipped with a disc braking unit.

In this second embodiment, an engine 124 is also mounted between the reinforcement rails 5L and 5R and the down-stays 6L and 6R (FIG. 1), and the engine 124 drives the rear wheel 123 through a drive chain 125. A fuel tank 126 is provided on the tank rails 4L and 4R and a driver's seat 127 is mounted on the seat rails 7L and 7R.

The front portion of the body of the motorcycle 100 is covered with a front cowling 128 formed of a synthetic resin to reduce air resistance which is caused when the motorcycle is travelling. The side portions of the motorcycle body and the driver's seat are covered by a side cover 129 and a tail cowling 130.

The motorcycle 100 of this second embodiment is also provided with an antiskid braking device 132 commonly shown in FIGS. 4 and 5 with the constitutional elements or members applied with reference numerals in parentheses as mentioned with reference to FIGS. 1 and 2, and these members or elements operate commonly and attain substantially the same functions in both the embodiments.

That is, the antiskid brake device of both the embodiments generally comprises a braking mechanism for braking wheels of a motorcycle, a master cylinder assembly operated in response to a brake operation force and adapted to brake the wheels through the braking mechanism, a sensor means for detecting a rotating speed of the wheels, a direction control valve means disposed on a fluid line connecting the master cylinder assembly and the braking mechanism, a pressure reducing cylinder assembly which is operatively connected to the direction control valve means and in which hydraulic oil is accumulated, a pump means connected through a fluid line between the master cylinder assembly and the pressure reducing cylinder assembly for returning the hydraulic oil from the pressure reducing cylinder assembly to the master cylinder assembly, and a control means for detecting a sign of locking of the wheels in accordance with an input from the sensor means, the control means being operatively connected to the braking mechanism, the direction control valve means and the pressure reducing cylinder assembly. Thus, the duplicated description to the antiskid device of the second embodiment is now omitted herein.

As described previously and shown in FIGS. 1 to 2 and FIGS. 4 to 10, the pump unit 136 includes the pump 136a and the motor 136b which are integrated. The pump unit 136 is mounted so that its longitudinal dimension runs along the length of the motorcycle 100 and so that a brake pipe port section 151 (see FIGS. 6, 7 and 10) of the pump 136a faces the back or the forth (forth in the case of the present embodiment) of the motorcycle 100. Further, the pump unit 136 is mounted entirely within the body frame 102.

The pump unit 136 is arranged side by side with another component, for example, a battery 152 along the body width. In this example, the pump unit 136 is placed on the opposite side (right side of the body) to the drive chain 125 beyond the battery 152.

Figure 10:
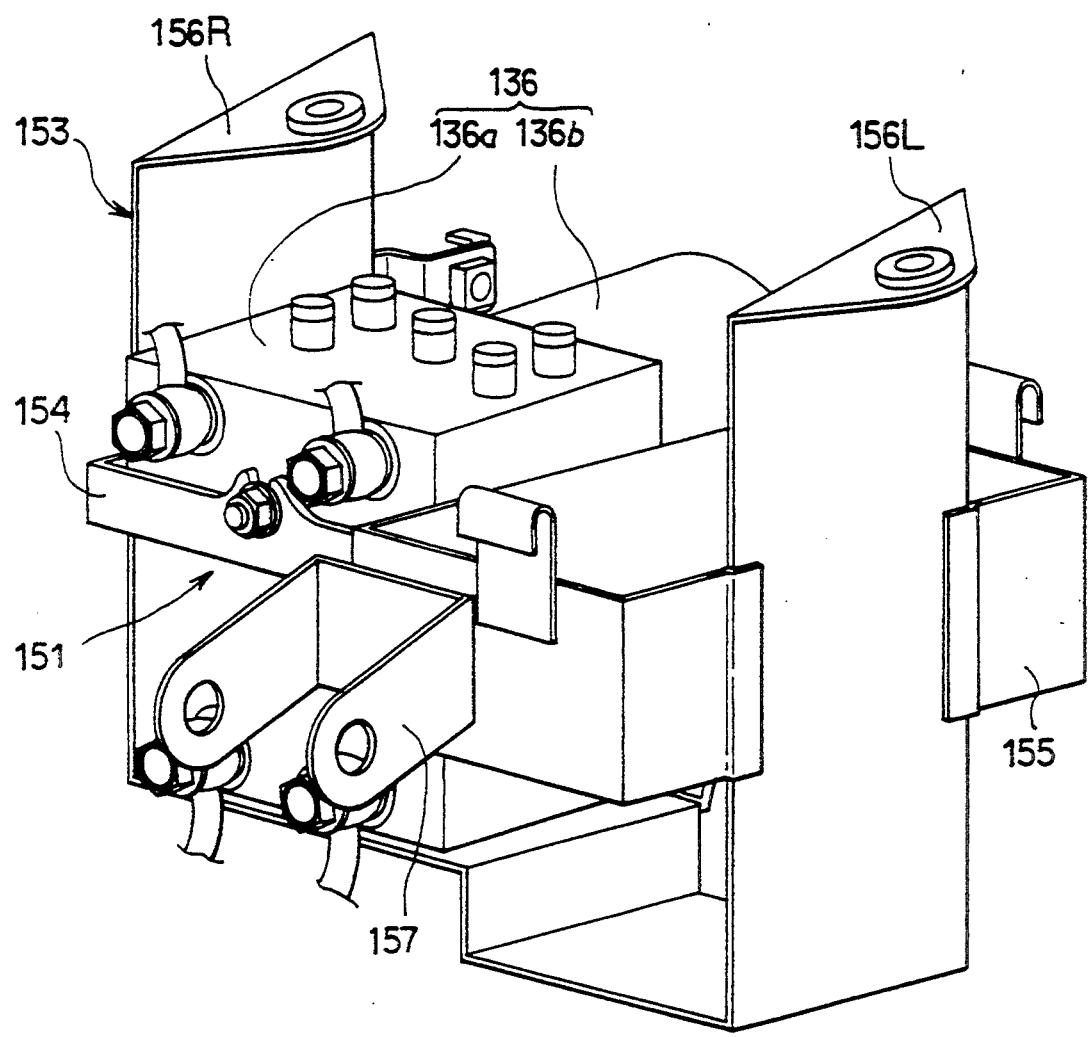
FIG. 10 is a perspective view of the pump unit and the pump unit holder taken obliquely from the left front.
Figure 11:
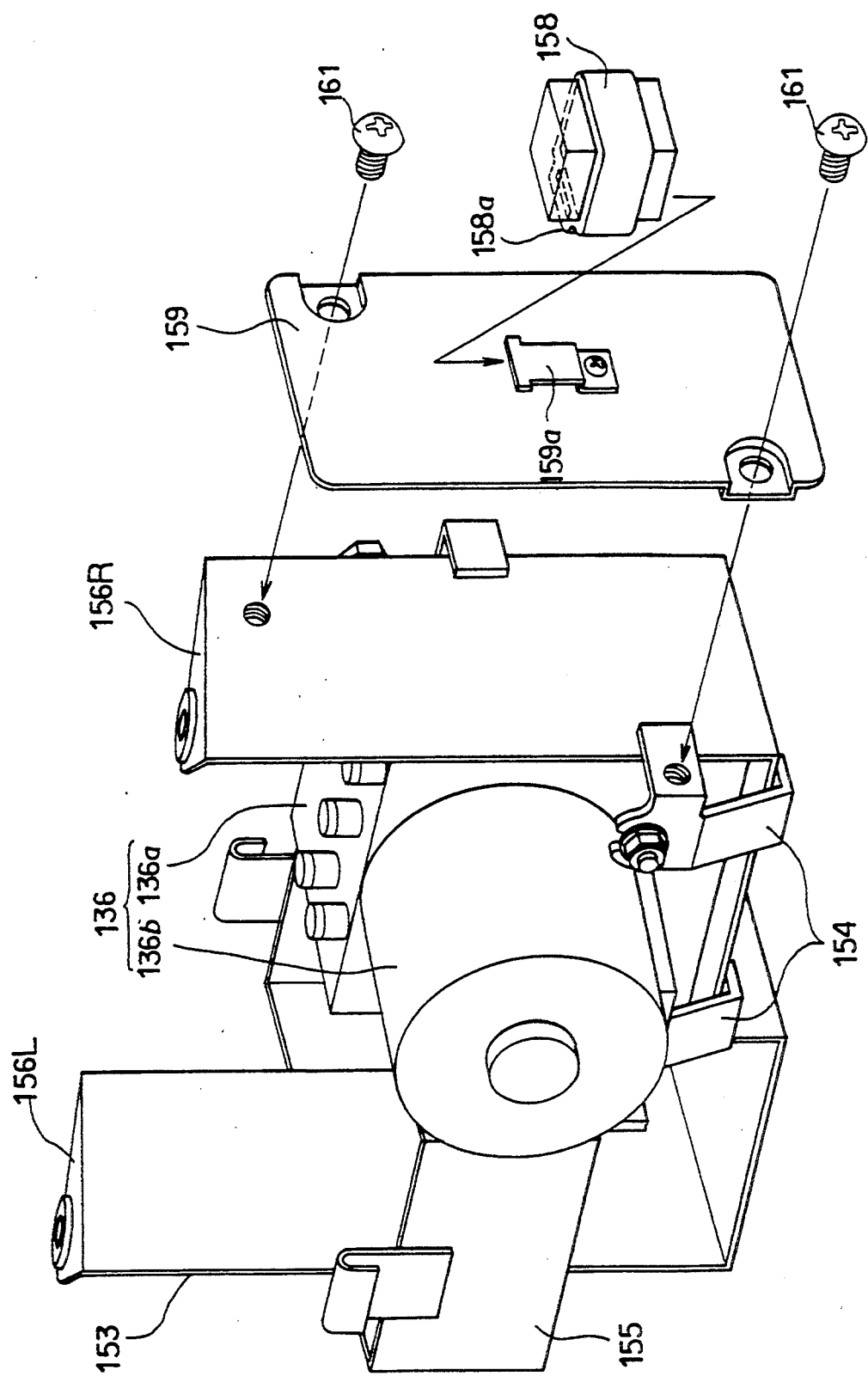
FIG. 11 is a perspective view of the pump unit and the pump unit holder taken obliquely from the rear right.

As shown in FIGS. 10 and 11, the pump unit 136 is held by the pump unit holder 153 fixed to the body frame 102. The pump unit holder 153 is provided with a pump unit holding section 154 for holding the pump unit 136 and further a battery holding section 155 for holding the battery 152. Top fixing sections 156L and 156R which are used for bolting the pump unit holder 153 to the seat rails 7L and 7R of the body frame 102 are provided on the top of the pump unit holder 153. A front fixing section 157 which is to be bolted to a fixing bracket 115 used for fastening the rear cushion unit 114, is provided on the front portion of the pump unit holder 153. That is, the fixing bracket 115 acts as a holding member for the pump unit 136 as well as for fastening the rear cushion unit.

As shown in FIG. 11, a supporting member 159 which supports another component, for example, a relay 158 is provided to the right of the pump unit 136. The supporting member 159 is fastened to the right side of the pump unit holder 153 by means of screws 161. The supporting member 159 has a holding section 159a, over which a hook 158a of the relay 158 is hooked. The sides of the pump unit 136, the battery 152 and the supporting member 159 are covered with the aforementioned side cover 129.

According to the antiskid braking device 132 structured as described above, the longitudinal dimension of the pump unit 136 runs along the length of the motorcycle body and the brake pipe port section 151 faces the back or the forth of the body. Thus, when the motorcycle 100 falls down or is hit on the side, the pump unit 136 and the brake pipes (line 141 and 142) are protected by the body frame 102 preventing them from being damaged. Furthermore, because the brake pipes (141 and 142) are connected to the front portion or the rear portion of the pump unit 136, they can be laid out more flexibly. Still furthermore, the width of the body frame can be reduced.

Since the pump unit 136 is provided within the body frame 102 and the supporting member 159 for supporting other component is provided on the side of the pump unit 136, when the motorcycle 100 falls down or an equivalent event occurs, the pump unit 136 is guarded by the body frame 102 and the supporting member 159 from being damaged.

Since the fixing bracket 115 of the rear cushion unit 114 is used as a holding member for the pump unit 136 as well, it is possible to reduce the number of the holding members (top fixing sections 156L and 156R) of the pump unit 136 and make the best use of the space around the pump unit 136. It is possible to reduce the manufacturing cost of the body frame 102. In addition, the body frame 102 can be easily adapted for a motorcycle having no antiskid braking device.

Furthermore, since the pump unit 136 is placed side by side with other component such as battery 152 along the body width and the pump unit 136 is arranged on the opposite side to the drive chain 125 beyond the above mentioned other component, even if the pump unit 136 is arranged at a lower position, there is no possibility that the pump unit 136 will interfere with the drive chain 125. Due to this effect and the fact that the width of the body frame 102 can be minimized, it is possible to reduce the height and width of the driver's seat 127. Consequently, it is possible to make foot contact more accessible regarding the motorcycle 100.

Still furthermore, since the battery 152 is mounted as other component which is arranged side by side with the pump unit 136, even if the pump unit 136 is mounted on one side running along the body width, the bilateral weight balance of the motorcycle body can be maintained because the battery 152 has almost the same weight as the pump unit 136.

Figure 12:
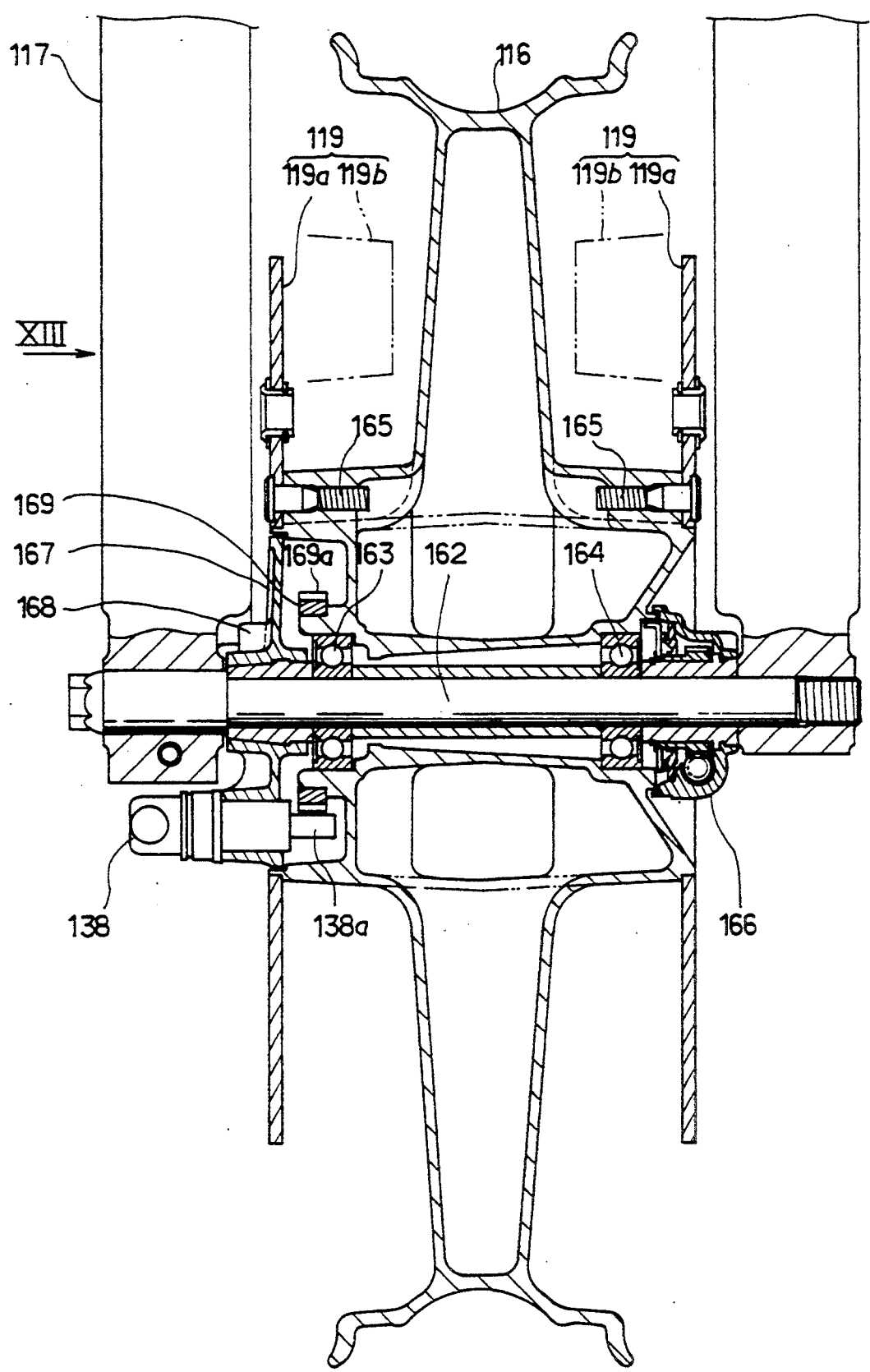
FIG. 12 is a sectional view of a disc braking device 19 taken along the line XII—XII in FIG. 1.
Figure 13:
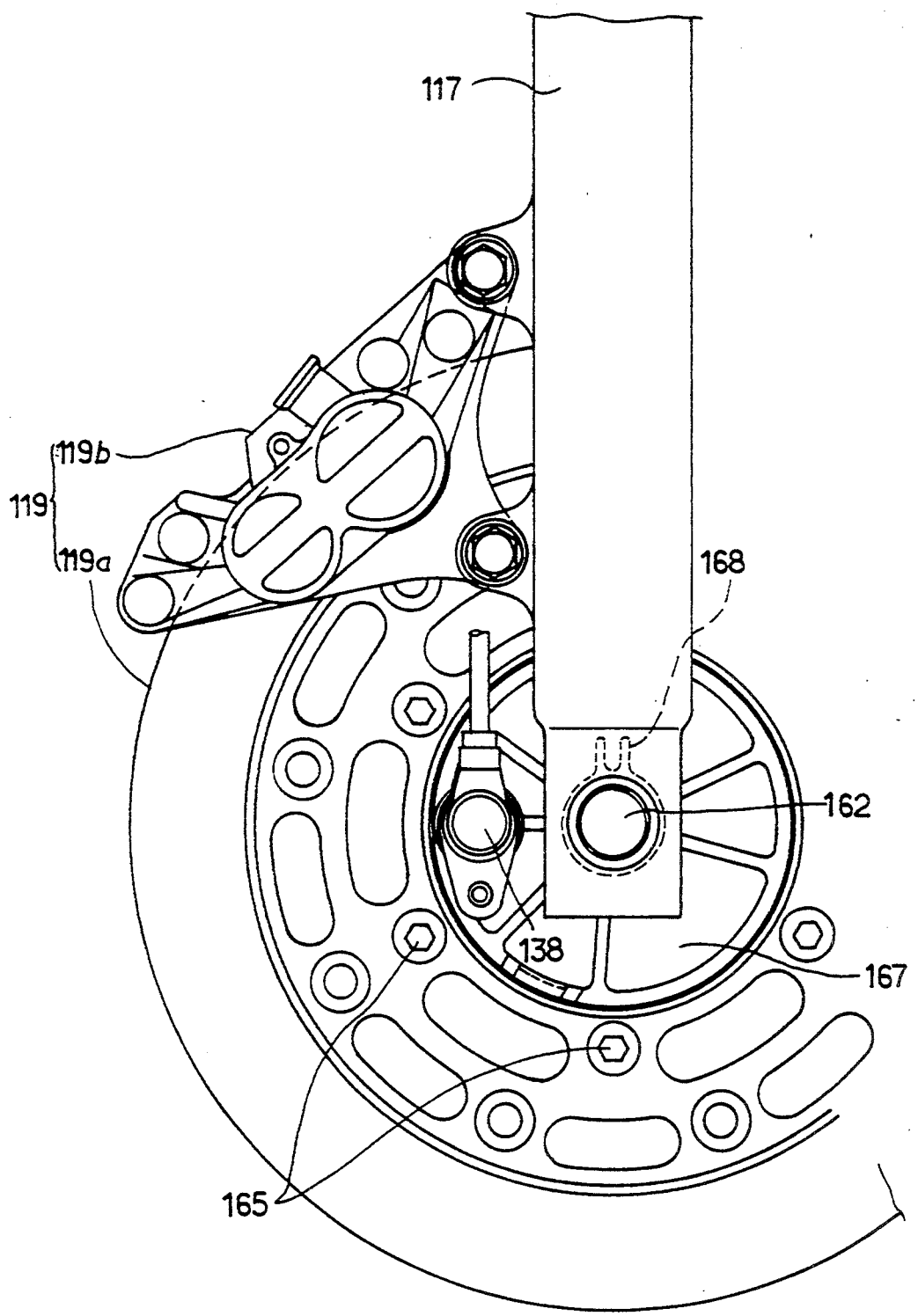
FIG. 13 is a right side view of the disc braking device taken according to the arrow XIII in FIG. 12.

FIG. 12 is a sectional view of the disc braking device 119 taken along the lines XII—XII of FIG. 1 and FIG. 13 is a right side view of the disk braking unit 119 viewed from the perspective of an arrow XIII in FIG. 12.

A shaft 162 is fixed on the front end of the front fork 117 and the front wheel 116 is rotatably supported by the shaft 162 via bearings 163 and 164. Disc rotors 119a are fixed to both sides of the front wheel 116 so that they rotate with front wheels 116 by means of bolts 165.

For example, a speed sensor 166 which actuates a speed-meter is fixed on the left side of the shaft supporting section of the front wheel 116 and the wheel speed sensor 138 is provided on the right side of the shaft supporting section of the front wheel 116. The wheel speed sensor 138 is fixed to the sensor plate 167 and the sensor plate 167 is fixed to the front fork 117 via a stopper 168.

On the other hand, a sensor ring 169 is fixed to the front wheel 116 by a fixing means such as by pressing-in. Gear-like cutouts 169a are provided at an equal interval on the circumference of the sensor ring 169 and the sensor ring 169 is covered with the sensor plate 167.

A sensing section 138a which is provided on the end of the wheel speed sensor 138 protrudes to the inside of the sensor plate 167 and the sensing section 138a faces the cutout 169a of the sensor ring 169. Thus, when the front wheel rotates, the sensor ring 169 rotates together and the moving amount of the cutout 169a is read by the sensing portion 138a.

When the sensor ring 169 is structured in the manner described above, the portion in which the sensor ring 169 is pressed is processed at the same time when the portions in which the bearings 163 and 164 are pressed (processed under the same chucking condition). Thus, the concentricity between the front wheel 116 and the sensor ring 169 can be improved markedly so that a gap between the sensing section 138a of the wheel speed sensor 138 and the cutout 169a of the sensor ring 169 becomes constant throughout the circumference of the sensor ring. Consequently, it is possible to read a speed accurately, thereby ensuring the operation of the antiskid braking device 132 more precisely.

Further, it is not necessary to fix the sensor ring 169 to the front wheel 116 by means of bolts, thus there is no fear that the wheel speed sensor reads motions of the above mentioned bolts, causing malfunction. In addition, since the above mentioned bolts are not necessary and the diameter of the sensor ring 169 can be reduced, it is possible to reduce the numbers of assembly parts and assembling processes and reduce the weight of the motorcycle.

The above described fixing structure of the sensor ring 169 may be provided on the braking unit of the rear wheel 123.

As described above, according to the another embodiment of the present invention, the antiskid braking device of the motorcycle includes the pump unit in which the pump which repressurizes the braking devices of the front and rear wheels and the motor which drives the pump are integrated, the pump unit being mounted so that the longitudinal dimension of the pump unit runs along the length of the motorcycle and the brake pipe port section faces the front or the rear direction of the motorcycle.

Thus, if the motorcycle falls down or is hit on the side, the pump unit and the brake pipes are protected from damage by the body frame. Additionally, because the brake pipes are connected to the front side or the rear side of the pump unit, they can be laid out more flexibly. Still further, the width of the body frame can be reduced.

The other advantageous effects can be also achieved by the present embodiment as described in the SUMMARY OF THE INVENTION.

It is to be noted that the present invention is not limited to the described embodiments and many other changes and modifications may be made without departing from the scopes of the appended claims.

What is claimed is:

1. An antiskid brake device for a motorcycle comprising:
   the braking mechanism for braking wheels of a motorcycle;
   a master cylinder assembly operated in response to a brake operation force and adapted to brake the wheels through the braking mechanism;
   a direction control valve means disposed on a fluid line connecting the master cylinder assembly and the braking mechanism;
   a pressure reducing cylinder assembly which is operatively connected to the direction control valve means;
   a pump means connected through a fluid line between the master cylinder assembly and the pressure reducing cylinder assembly, said pump means and said braking mechanism being connected through front wheel brake pipes;
   a control means operatively connected to the braking mechanism, the direction control valve means and the pressure reducing cylinder assembly,
   wherein said pump means includes a single pump unit to repressurize the braking mechanism and is mounted at substantially a central portion of a body frame of the motorcycle, middle portions of the front wheel brake pipes are formed of metallic pipes, both ends of the metallic pipes are connected to the braking mechanism, the master cylinder and the pump unit through flexible brake hoses, and the metallic pipes are arranged along an inside face of a pair of bilateral tank rails of the body frame extending rearward from a head pipe of the motorcycle.

2. An antiskid braking device for a motorcycle according to claim 1, wherein said metallic pipes are arranged along an inside face of either one of the bilateral tank rails of the body frame and an electric wire harness extending from the front to the rear of a body of the motorcycle is arranged along an inside face of another one of the tank rails of the body frame.

3. An antiskid braking device for a motorcycle according to claim 1, wherein connecting sections connecting front ends of said metallic pipes to said brake hoses are arranged near the head pipe of the body frame below a fuel tank disposed between the head pipe and a seat for a rider and connecting sections connecting rear ends of said metallic pipes to said brake hoses are arranged near and above a pivotal section of swing arms disposed forward the rear wheel.

4. An antiskid brake device for a motorcycle comprising:
   the braking mechanism for braking wheels of a motorcycle;
   a master cylinder assembly operated in response to a brake operation force and adapted to brake the wheels through the braking mechanism;
   a direction control valve means disposed on a fluid line connecting the master cylinder assembly and the braking mechanism;
   a pressure reducing cylinder assembly which is operatively connected to the direction control valve means;
   a pump means connected through a fluid line between the master cylinder assembly and the pressure reducing cylinder assembly, said pump means and said braking mechanism being connected through front wheel brake pipes;
   a control means operatively connected to the braking mechanism, the direction control valve means and the pressure reducing cylinder assembly,
   wherein said pump means includes a pump unit for repressurizing braking mechanism for front and rear wheels of a motorcycle and a motor for driving the pump unit integrally arranged with the pump unit, said pump unit is mounted so as to extend in a longitudinal dimension thereof along a longitudinal direction of the motorcycle and a brake pipe port section faces front and rear directions of the body of the motorcycle.

5. An antiskid braking device for a motorcycle, according to claim 4, wherein said pump means has a side portion on which a supporting member for supporting a body component is provided.

6. An antiskid braking device for a motorcycle, according to claim 4, wherein said pump means is provided within the body frame of the motorcycle.

7. An antiskid braking device for a motorcycle, according to claim 4, wherein said pump means is held by a holding means formed as a fixing bracket for a rear cushion of the motorcycle.

8. An antiskid braking device for a motorcycle, according to claim 5, wherein said pump means is arranged side by side with the body component along a width direction of the body of the motorcycle and said pump means is arranged on a side opposite to a drive chain for an engine unit beyond said body component.

9. An antiskid braking device for a motorcycle, according to claim 8, wherein said body component comprises a battery.

* * * * *